United States Patent
Eloff

(10) Patent No.: US 9,776,482 B2
(45) Date of Patent: Oct. 3, 2017

(54) EMERGENCY EXIT DOOR FOR A VEHICLE

(71) Applicant: Allied Recreation Group, Inc, Decatur, IN (US)

(72) Inventor: Johann Eloff, Fort Wayne, IN (US)

(73) Assignee: Allied Recreation Group, Inc., Decatur, IN (US)

( * ) Notice: Subject to any disclaimer, the term of this patent is extended or adjusted under 35 U.S.C. 154(b) by 0 days.

(21) Appl. No.: 14/939,332

(22) Filed: Nov. 12, 2015

(65) Prior Publication Data

US 2016/0137040 A1    May 19, 2016

Related U.S. Application Data

(60) Provisional application No. 62/079,088, filed on Nov. 13, 2014.

(51) Int. Cl.
*B60J 5/04* (2006.01)
*B60R 3/02* (2006.01)

(52) U.S. Cl.
CPC .......... *B60J 5/0486* (2013.01); *B60J 5/0472* (2013.01); *B60R 3/02* (2013.01)

(58) Field of Classification Search
CPC .......... B60J 5/0486; B60J 5/0472; B60R 3/02
See application file for complete search history.

(56) References Cited

U.S. PATENT DOCUMENTS

| | | | |
|---|---|---|---|
| 4,216,725 A | 8/1980 | Hallam | |
| 4,274,190 A | 6/1981 | Slattery | |
| 4,615,275 A | 10/1986 | Ishizuka | |
| 5,312,150 A | 5/1994 | Quam | |
| 5,669,307 A | 9/1997 | Cichy | |
| 6,460,915 B1 * | 10/2002 | Bedi | B60J 5/0498 296/151 |
| 6,749,251 B1 | 6/2004 | Papsdorf | |
| 7,036,870 B2 | 5/2006 | Nieminski et al. | |

* cited by examiner

*Primary Examiner* — Glenn Dayoan
*Assistant Examiner* — Melissa A Black
(74) *Attorney, Agent, or Firm* — Hovey Williams LLP

(57) ABSTRACT

An emergency exit door assembly for a vehicle. The door assembly comprises a main panel including an interior-facing surface and exterior-facing surface. The main panel is rotatably connected to the vehicle, such that the main panel is configured to selectively alternate between a closed position in which the interior-facing surface faces an interior of the vehicle and an open position in which the interior-facing surface faces an exterior of the vehicle. The door assembly additionally comprises one or more projection members extending from the interior-facing surface of the main panel. The projection members each include a first major surface configured to support articles within an interior of the vehicle while the main panel is in the closed position. The door assembly further comprises a support mechanism configured to support the main panel in the open position.

20 Claims, 10 Drawing Sheets

EMERGENCY EXIT DOOR FOR A VEHICLE

RELATED APPLICATIONS

This non-provisional patent application claims priority to U.S. Provisional Patent Application Ser. No. 62/079,088 filed on Nov. 13, 2014, and entitled "EMERGENCY EXIT DOOR FOR A VEHICLE," the disclosure of which is herein incorporated by reference in its entirety.

FIELD OF THE INVENTION

The present invention is directed to a door assembly for a vehicle. In particular, embodiments of the present invention are directed to a door assembly configured to provide an emergency exit for a recreational vehicle, such as a travel trailer, motorcoach, or the like.

BACKGROUND

Recreational vehicles, such as travel trailers, motorcoaches, fifth-wheels, and the like, are generally large vehicles configured to house multiple passengers during long trips and extended stays. As such, recreational vehicles often have multiple rooms to provide living and sleeping spaces for the passengers. For example, it is common for recreational vehicles to include a driving compartment situated near a front of the vehicle, a living-room compartment situated near a central portion of the vehicle, a bathroom situated near the central or a rear portion of the vehicle, and one or more bedrooms situated near the central or the rear portion of the vehicle.

Although recreational vehicles are generally large in size, as described above, they are often only manufactured with a single door (i.e., a primary door) for ingress and egress. Generally, the primary door is positioned near the front of the vehicle, so as to provide efficient access to the driving cab or to the living-room compartment of the vehicle. To access the primary door from the bathrooms or from the bedrooms, passengers must traverse nearly the length of the recreational vehicle. As such, in the case of an emergency, such as a fire in the recreational vehicle or a medical emergency, passengers located in the bathroom or the bedrooms must traverse a significant distance to reach the primary door to exit the recreational vehicle. In some emergency situations, it may not be possible to safely traverse such a distance. For instance, a fire might be impeding the path to the primary door and/or dense smoke may make it difficult or impossible to traverse the path to the primary door.

Some recreational vehicles include emergency exit windows that may be used for emergency egress. However, such emergency exit windows are generally small in size, which make them difficult for passengers to easily egress through. Further, such emergency exit windows are generally positioned at a significant height above the exterior ground surface. As such, exiting through the emergency exit windows can be a difficult action to perform in a safe manner.

Furthermore, because of the size constraints of recreational vehicles, it is difficult to find sufficient available space within a recreational vehicle to devote solely to an emergency exit for the vehicle.

Given the above, there is a need for an emergency exit that provides for emergency egress from a recreational vehicle, with such an emergency exit being spaced apart from the recreational vehicle's primary door so as to facilitate emergency egress from portions of the recreational vehicle that are spaced apart from the primary door. Additionally, there is a need for an emergency exit that provides passengers a simple and safe egress route from within the recreational vehicle. Furthermore, there is a need for an emergency exit that can be efficiently integrated with the living space of the recreational vehicle, taking into consideration the recreational vehicle's inherent size constraints.

SUMMARY OF THE INVENTION

In one embodiment of the present invention, there is provided an emergency exit door assembly for a vehicle. The door assembly comprises a main panel including an interior-facing surface and exterior-facing surface. The main panel is rotatably connected to the vehicle, such that the main panel is configured to selectively alternate between a closed position in which the interior-facing surface faces an interior of the vehicle and an open position in which the interior-facing surface faces an exterior of the vehicle. The door assembly additionally comprises one or more projection members extending from the interior-facing surface of the main panel. The projection members each include a first major surface configured to support articles within an interior of the vehicle while the main panel is in the closed position. The door assembly further comprises a support mechanism configured to support the main panel in the open position.

In another embodiment of the present invention, there is provided a door assembly for a vehicle. The door assembly comprises a main panel including an interior-facing surface and exterior-facing surface. The main panel is configured to selectively alternate between a closed position and an open position. The door assembly additionally comprises one or more projection members extending from the interior-facing surface of the main panel, with each of the projection members including a first major surface and a second major surface. In the closed position, the first major surfaces of the projection members are configured to support articles within an interior of the vehicle. In the open position, the second major surfaces of the projection members are configured to support a foot of a user egressing from the vehicle.

In yet another embodiment of the present invention, there is provided a method of operating an emergency exit door assembly for a vehicle, with the door assembly comprising a main panel with a top side and a bottom side and a plurality of projection members extending generally perpendicularly from the main panel. The method comprises the initial step of unlatching the main panel from the vehicle. An additional step includes causing the main panel to actuate from a closed position, in which the top side extends further from a ground level than the bottom side, to an open position, in which the bottom side extends further from the ground level than the top side. In the closed position the projection members are configured to support one or more articles within an interior of the vehicle. In the open position the projection members are configured to support a foot of a human passenger of the vehicle, as the passenger egresses from the vehicle.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE FIGURES

Embodiments of the present invention are described herein with reference to the following drawing figures, wherein.

Figure 1:
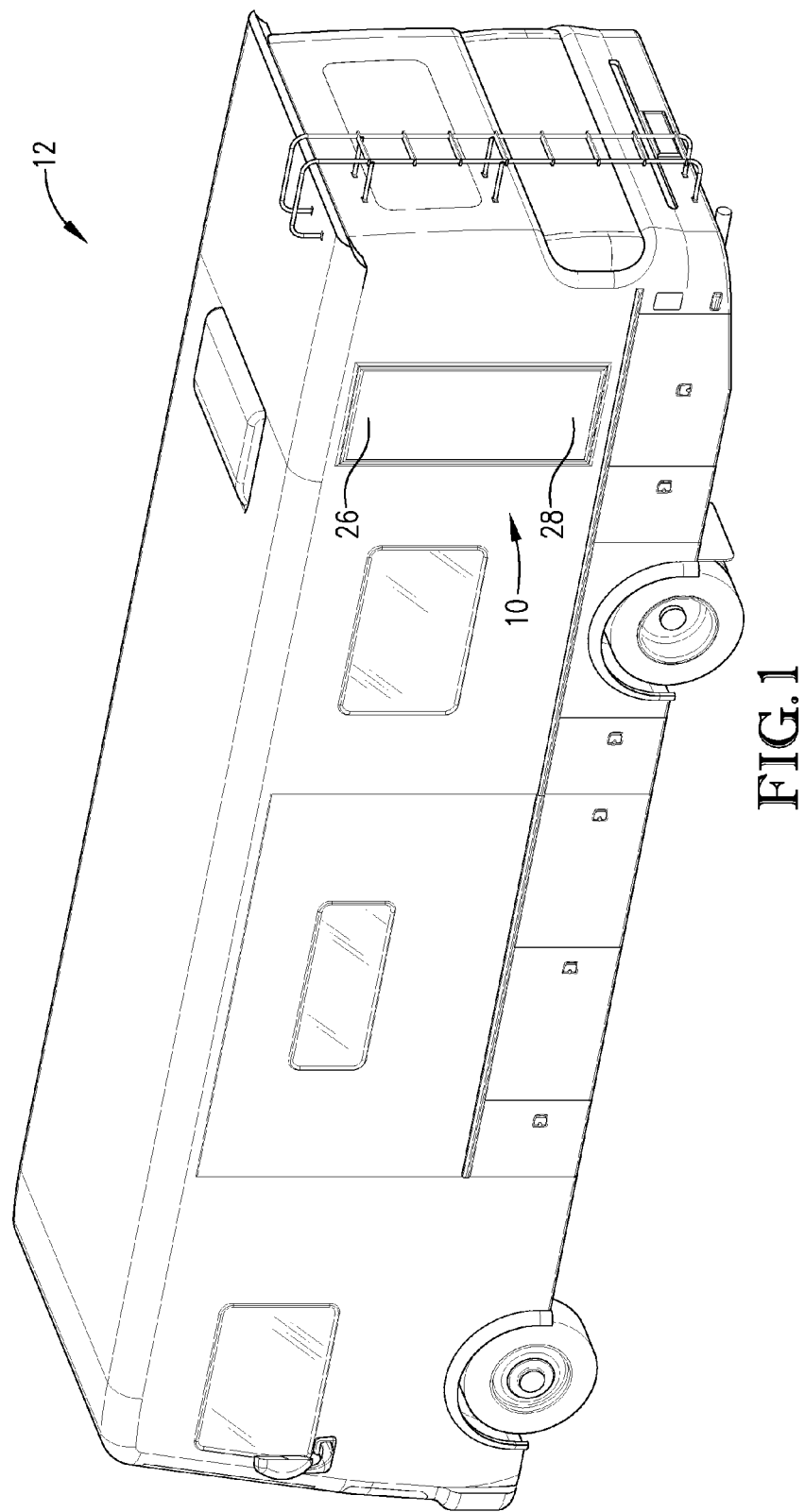
FIG. 1 is a side rear perspective view of a recreational vehicle with an emergency exit door assembly according to embodiments of the present invention, with the door assembly in the closed position.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Figure 2:
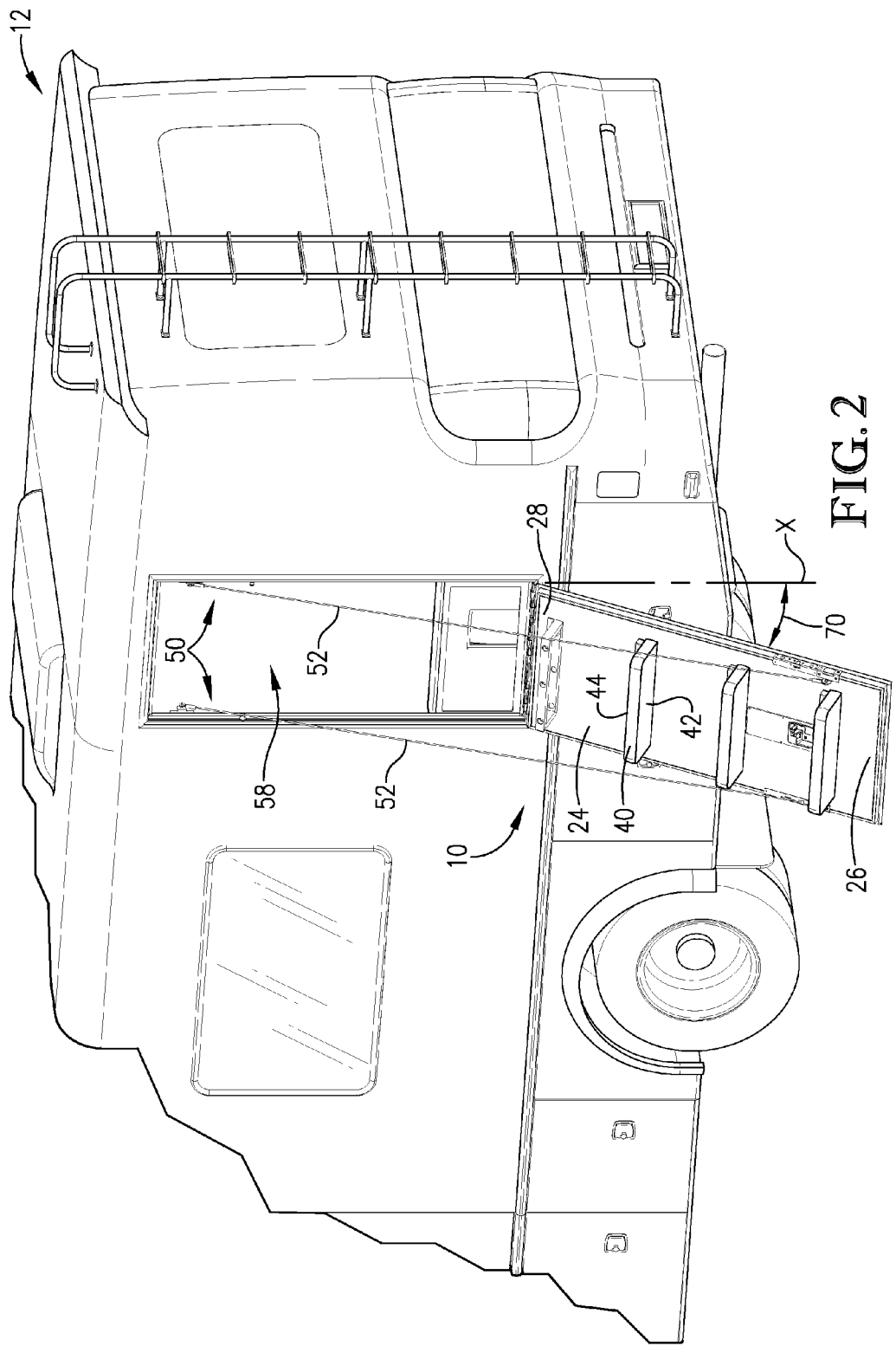
FIG. 2 is a partial perspective view of the recreational vehicle from FIG. 1, particularly showing the emergency exit door assembly in the open position.

With reference to FIGS. 1 and 2, embodiments of the present invention are broadly directed to a door assembly 10 for a vehicle 12. The vehicle 12 may be a recreational vehicle (i.e., an "RV"), such as a travel trailer, a motorcoach, a fifth-wheel, a camper, or the like. In some embodiments, the door assembly 10 will be used as an emergency exit, such that it may be preferable for the door assembly 10 to be set apart from a primary door of the vehicle 12. Although the vehicle's primary door is not shown in FIG. 1 or 2, it may be assumed that the primary door is positioned on an opposite side of the vehicle 12, towards a front of the vehicle. In more detail, in some embodiments, such as illustrated in FIG. 1, the door assembly 10 may be positioned on a side of the vehicle 12, towards a rear of the vehicle 12. However in other embodiments, the door assembly 10 may be located on a back end of the vehicle 12. With the door assembly 10 positioned on the side or on the back end of the vehicle 12, the door assembly 10 can be used an emergency exit that provides a closer egress route for passengers and/or occupants of the vehicle 12 than the vehicle's 12 primary door.

Figure 3:
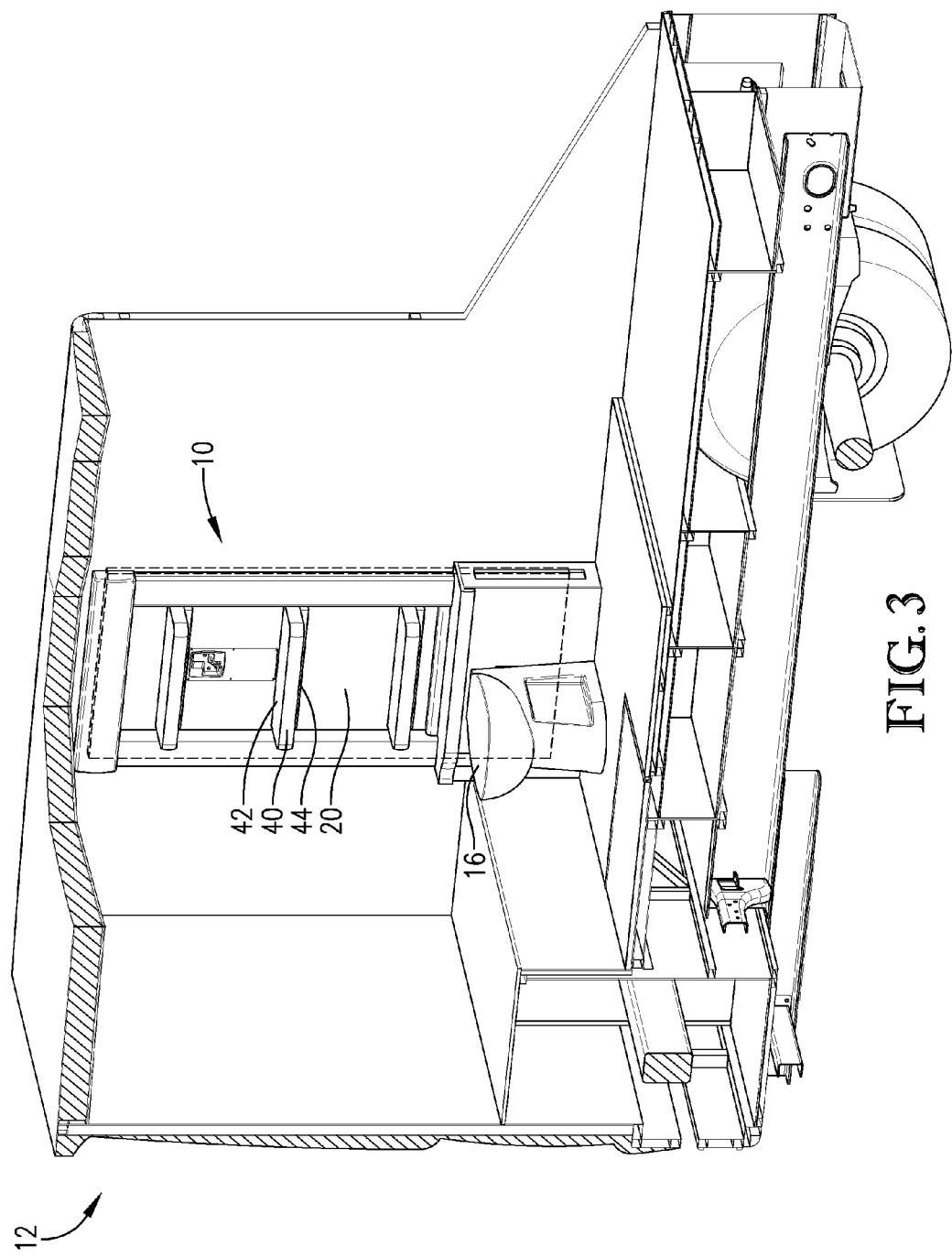
FIG. 3 is a partial perspective view of an interior of the vehicle from FIGS. 1 and 2, particularly showing the emergency exit door assembly in the closed position and being associated with a bathroom of the vehicle.

Because the door assembly 10 may be positioned towards the back end of the vehicle 12, the door assembly 10 may be associated with and/or integrated with a bathroom or a bedroom of the vehicle 12. For example, as shown in FIG. 3, the door assembly 10 may be associated with a bathroom of the vehicle 12. Specifically, for example, the door assembly 10 may be positioned behind a toilet 16 in the vehicle's 12 bathroom. In such an embodiment, a passenger of the vehicle 12 can exit the vehicle 12 via the bathroom, and specifically via the door assembly 10 positioned behind the toilet 16, in an emergency situation. Such a capability may be beneficial for instance, if a fire exists in the vehicle 12 at a position between the passenger's location and the vehicle's 10 primary door. For instance, if the passenger is located in the bedrooms or in the bathroom, which are positioned towards a rear of the vehicle, the passenger may be prevented from reaching the primary door to exit the vehicle 10. Nevertheless, the position of the door assembly 10 in the bedroom or bathroom (as shown in FIG. 3) allows the passenger to safely egress from the vehicle 10. It should be understood that in additional embodiments, however, the door assembly 10 may be associated with other rooms within the vehicle 12, such as storage rooms, closets, or the like.

Figure 4:
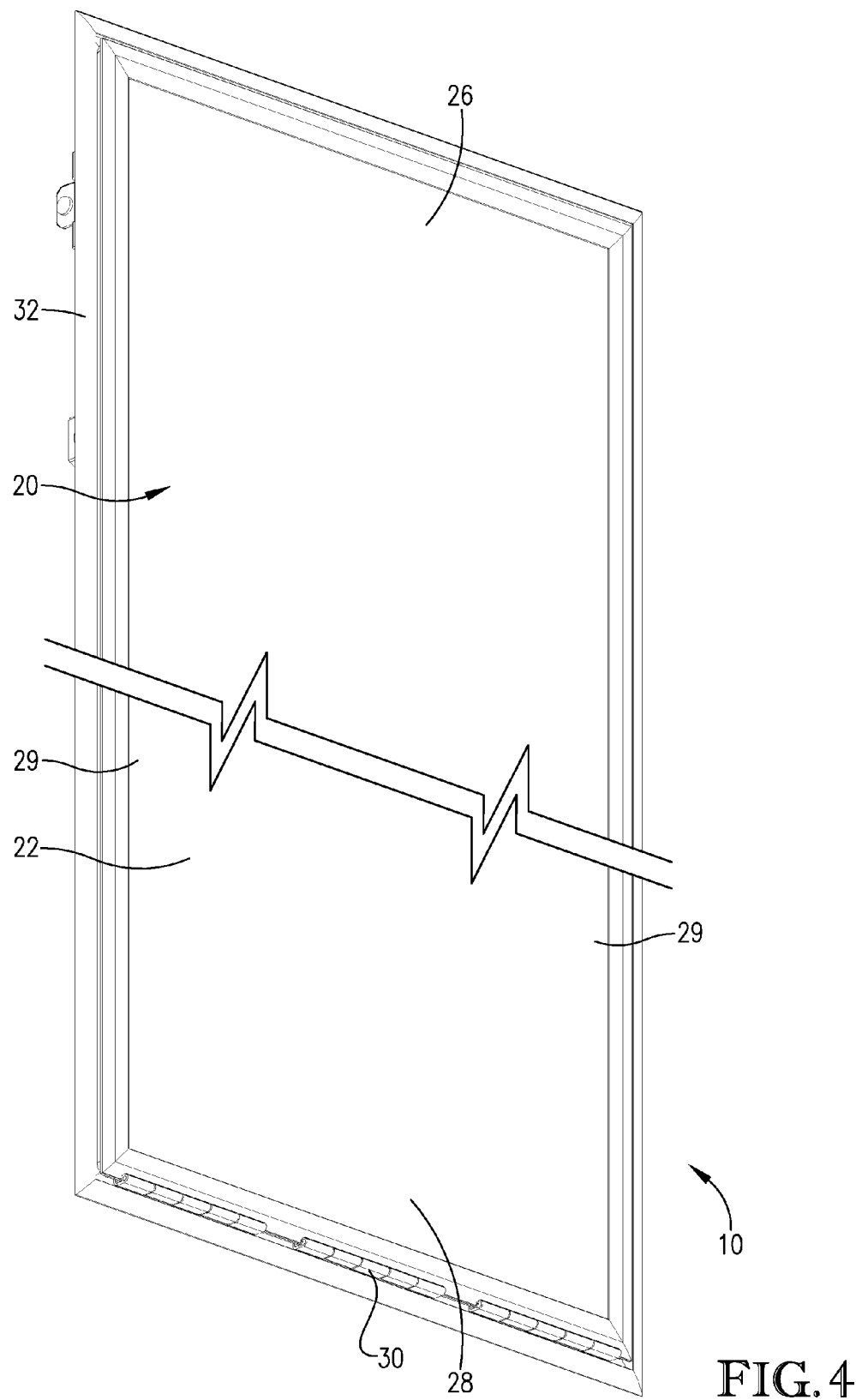
FIG. 4 is an exterior broken perspective view of the emergency exit door assembly from FIGS. 1-3, with the emergency exit door assembly in the closed position.
Figure 5:
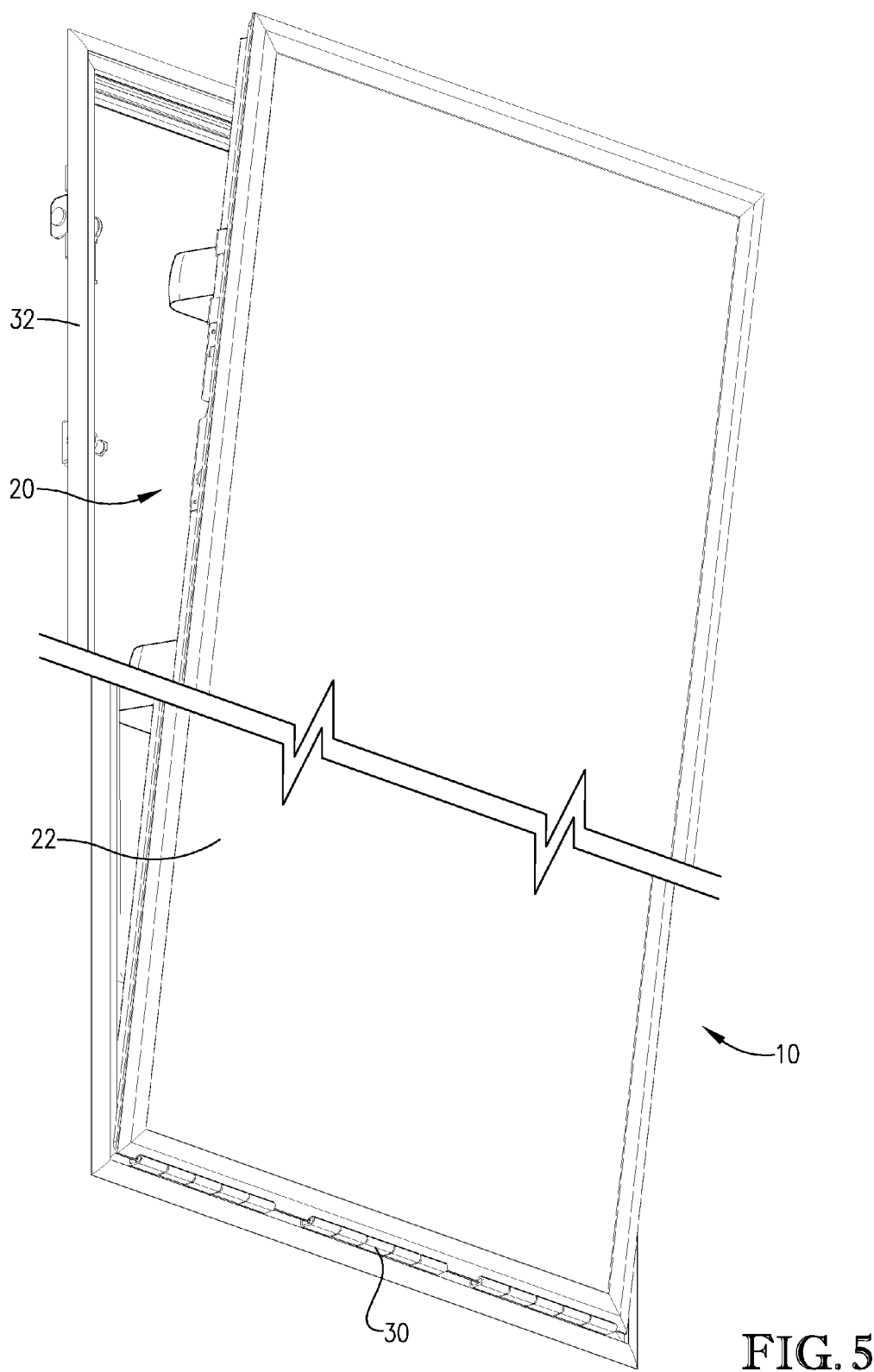
FIG. 5 is an exterior broken perspective view of the emergency exit door assembly from FIGS. 1-4, with the emergency exit door assembly being transitioned from the closed position to the open position.
Figure 6:
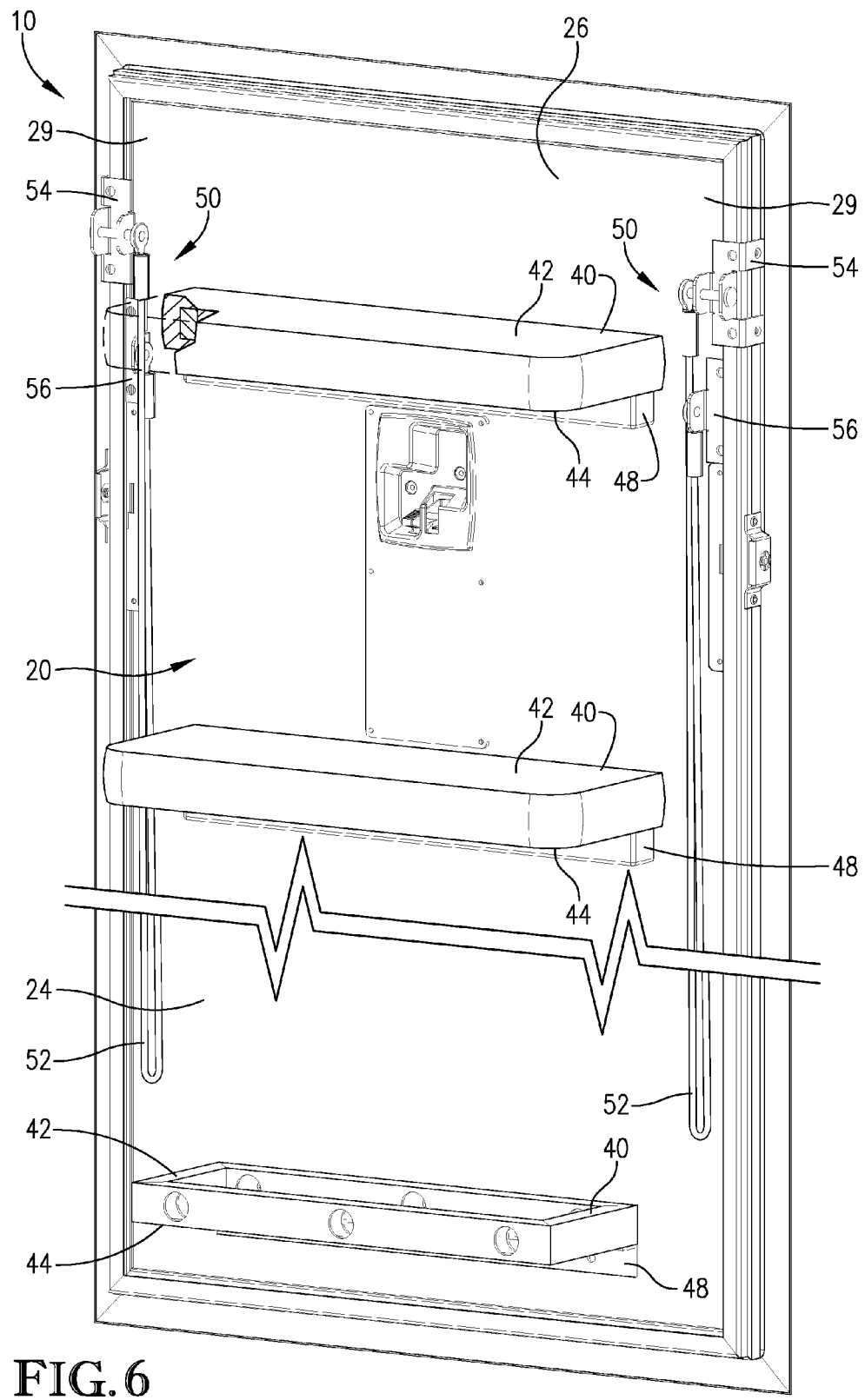
FIG. 6 is an interior broken perspective view of the emergency exit door assembly from FIGS. 1-5, with the emergency exit door assembly in the closed position.
Figure 7:
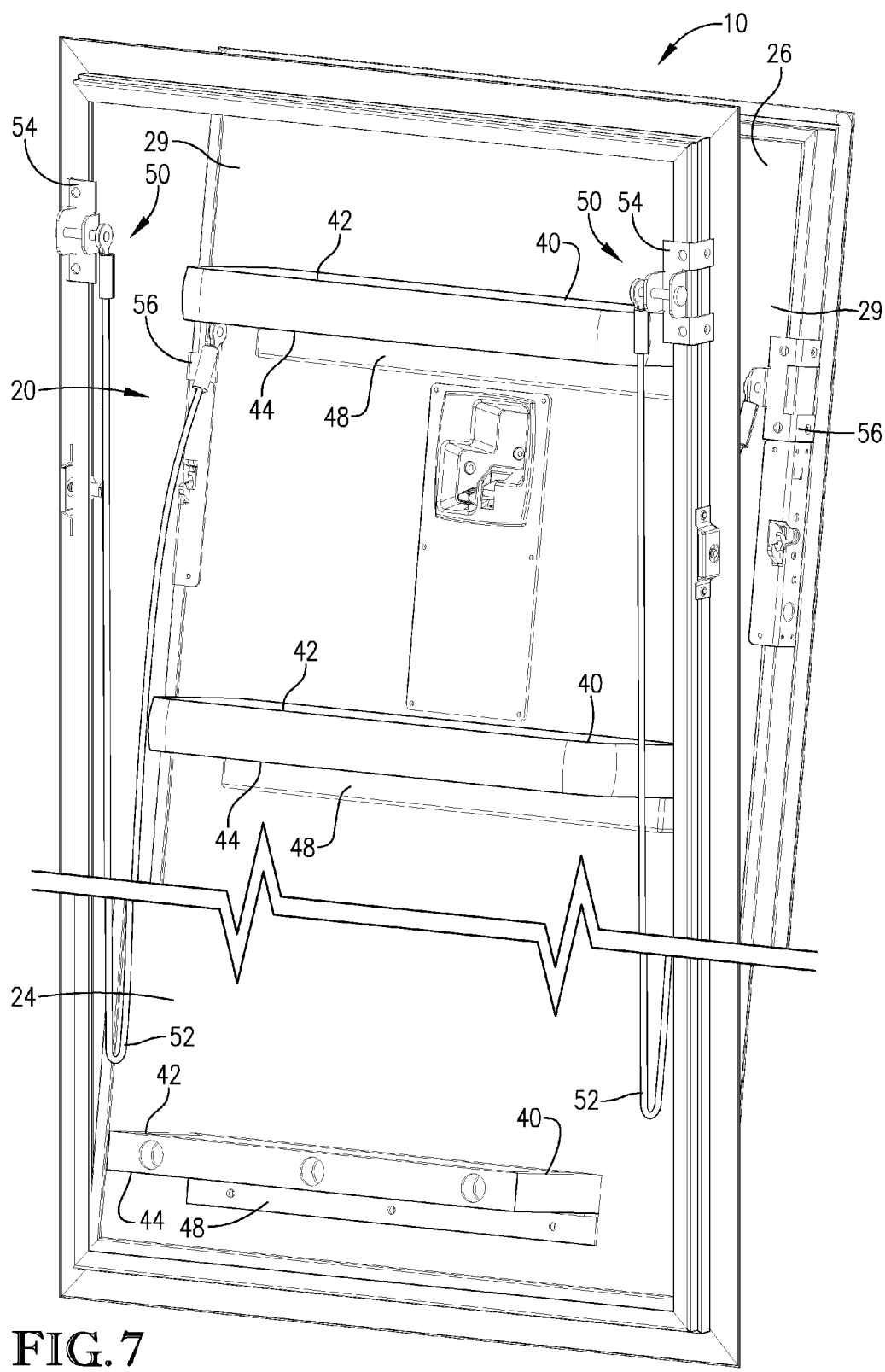
FIG. 7 is an interior broken perspective view of the emergency exit door assembly from FIGS. 1-6, with the emergency exit door assembly being transitioned from the closed position to the open position.

Turning to FIGS. 4-7, the door assembly 10 may broadly comprise a main panel 20 having an exterior-facing surface 22 (FIGS. 4-5) and an interior-facing surface 24 (FIGS. 6-7). In some embodiments, as shown in FIG. 4, the door assembly 10 may be generally rectangular, thereby including a top side 26, a bottom side 28, and two lateral sides 29. With the door assembly 10 in a closed position (i.e., FIG. 1), the top side 26 is oriented further away from a ground surface (on which the vehicle 12 is positioned) than the bottom side 28.

Contrastingly, with the door assembly 10 in an open position (i.e., FIG. 2), the top side 26 is oriented closer to the ground surface than the bottom side 28. In such embodiments, the top and bottom sides 26, 28 may include a length of between 2 and 8 feet, between, between 3 and 6 feet, or between 4 and 5 feet. The lateral sides 29 may include a length of between 4 and 12 feet, between, between 6 and 10 feet, or between 7 and 9 feet. Furthermore, the main panel 20 may include a thickness of between 1 to 6 inches, between 2 to 5 inches, or between 3 to 4 inches. The main panel 20 may be formed from metal, synthetic or partially-synthetic materials, wood-based materials, or the like, or combinations thereof. For instance, in some embodiments, the main panel 20 may be formed from aluminum, natural wood, wood veneer, laminate, particleboard, pressboard, fiberglass, or carbon fiber.

As shown in FIGS. 4-5, the main panel 20 may be rotatably connected to the vehicle 10 via one or more hinge members 30, such that the main panel 20 is configured to selectively actuate between a closed position (i.e., FIG. 1) in which the interior-facing surface 24 of the main panel 20 faces an interior of the vehicle 12, and an open position (i.e., FIG. 2) in which the interior-facing surface 24 of the main panel 14 faces an exterior of the vehicle 12. In some embodiments, the hinge members 30 may connect the bottom side 28 of the main panel 20 directly to the vehicle 12. In other embodiments, as shown in FIGS. 4-5, the hinge members 30 may connect the bottom side 28 of the main panel 20 to a door frame 32, with such door frame 32 being secured to the vehicle 12.

As perhaps best shown by FIGS. 6-7, the door assembly 10 may include one or more projection members 40 extending from the interior-facing surface 24 of the main panel 20. Embodiments of the present invention may provide for as many as 2, 4, 6, 8, or more projection members 40 extending from the main panel 20. For example, the embodiment shown in FIG. 2 illustrates a main panel 20 with four projection members 40 extending from the interior-facing surface 24 of the main panel 20, with the projection members 40 being spaced apart and extending between the top side 26 and the bottom side 28 of the main panel 20.

As illustrated, the projection members 40 may be formed as a rectangular slat, including a first major surface 42 and a second major surface 44 separated by a thickness of the projection member 40. As shown in FIGS. 6-7, in the closed position of the door assembly 10, the first major surface 42 faces an upward direction, while the second major surface 44 faces a downward direction. Contrastingly, as shown in FIG. 2, in the open position of the door assembly 10, the first major surface 42 faces a downward direction, while the second major surface 44 faces an upward direction. In some embodiments, the projection members 40 may extend generally perpendicularly with respect to the main panel 20. Specifically, the first and second major surfaces 42, 44 of the projection members 40 may extend generally perpendicularly with respect to the main panel 20. However, in other embodiments, the projection members 40 may extend at angles other than perpendicular angles from the main panel 20.

As will be described in more detail below, the projection members 40 may be configured to support various articles while the door assembly 10 is in the closed position (e.g., via the first major surface 42) and may be used to support passengers of the vehicle 12 as the passengers egress from the vehicle 12 while the door assembly 10 is in the open position (e.g., via the second major surface 44). To accomplish such support, the surface areas of each of the major surfaces 42, 44 are sized to at least accommodate an average foot size of an adult human. For example, in some embodiments, the areas of the major surfaces 42, 44 may be between 70 and 220 square inches, between 100 and 180 square inches, or between 120 and 160 square inches. In some embodiments, the projection members may be formed with a thickness of between 1 and 6 inches, between 2 and 5 inches, or between 3 and 4 inches.

In some embodiments, the projection members 40 may be formed from a solid, unitary piece of material, such as metal, fiberglass, natural wood or wood based products (e.g., particleboard, pressboard, etc.), or the like. The projection members 40 may be secured to the main panel 20 via various types of fasteners (e.g., nut/bolt combinations, screws, etc.), adhesives, welding, tongue and groove fittings, or the like. In some alternative embodiments, such as illustrated by a bottom-most of the projection members 40 in FIGS. 6-7, the projection members 40 may comprise an underlying metal (e.g., aluminum) mounting frame that is secured to the main panel 20 of the door assembly, such as via various types of fasteners (e.g., nut/bolt combinations). The projection members 40 may further comprise a covering material that surrounds the metal mounting frame to provide a finish and/or to provide support for articles and for passengers. The covering material may comprise various types of materials, such as aluminum, natural wood, wood veneer, laminate, particleboard, pressboard, and fiberglass, or the like.

In event further embodiments, as shown in FIGS. 6-7, the structural integrity of each of the projection members 40 may be enhanced by a projection member support component 48, which may comprise a block or a flange member positioned adjacent to and/or contacting a bottom portion of the projection member 40. Certain embodiments may provide for the projection member support component 48 to be integrally formed with the projection member 40. In some embodiments, the projection member support component may secured to the main panel 20 via fasteners (e.g., screws, nut/bolt combinations, etc.), welding, adhesives, or the like. The projection member support component 48 may increase the structural integrity of the projection members 40 by strengthening their connections to the main panel 20. As such, the ability of the projection members 40 to support articles and passengers is enhanced.

The main panel 20 can be supported in the open position (e.g., FIG. 2) via a support mechanism 50, as illustrated in FIGS. 2, 6, and 7, which may comprise one or more longitudinal supports 52 that provide a connection support between the main panel 20 and the vehicle 12. For instance, in some embodiments, the longitudinal supports 52 may comprise flexible cables, wires, chains or the like. As such, the longitudinal supports 52 may each be secured by a first end to the vehicle 12 and/or to the door frame 32 via a first support bracket 54 and by a second end to the main panel 20 via a second support bracket 56. The first and second support brackets 54, 56 may be secured to the vehicle 12, the door frame 32, and/or the main panel 20 via fasteners, such as screws, nut/bolt combinations, or the like. In more detail, as perhaps best illustrated by FIGS. 6-7, the second ends of the longitudinal supports 52 may be connected, via the second support brackets 56, to the main panel 20 at a position that is generally adjacent to the top and lateral sides 26, 29 of the main panel 20. Similarly, in some embodiments, the first end of the longitudinal supports 52 may be connected, via the first support brackets 54, to the vehicle 12 and/or the door frame 32 a position that is generally adjacent to a top side of a doorway 58 presented as an opening in the side of the vehicle 12 by the door assembly 10 in the open position (See FIG. 2).

In more detail, the support mechanism 50 may comprises two longitudinal supports 52. As described above, the longitudinal supports 52 may comprise a flexible member, which may include a metal cable, a chain, a cord, or a rope. In some embodiments, the longitudinal supports 52 may include a flexible covering material, such as plastic, which covers a strong, flexible wire. Given the flexibility of the longitudinal supports 52, with the door assembly 10 in the closed position (e.g., FIG. 6), the longitudinal supports 52 may be in a folded configuration. Alternatively, with the door assembly in the open position (e.g., FIG. 2), the longitudinal supports 52 may be fully-extended, in a generally linear configuration. As will be described in more detail below, the longitudinal supports 52 may be configured to support the main panel 20 of the door assembly in the open position. As such the longitudinal members may have a length of between 4 and 20 feet, between, between 6 and 16 feet, or between 8 and 12 feet.

Figure 8:
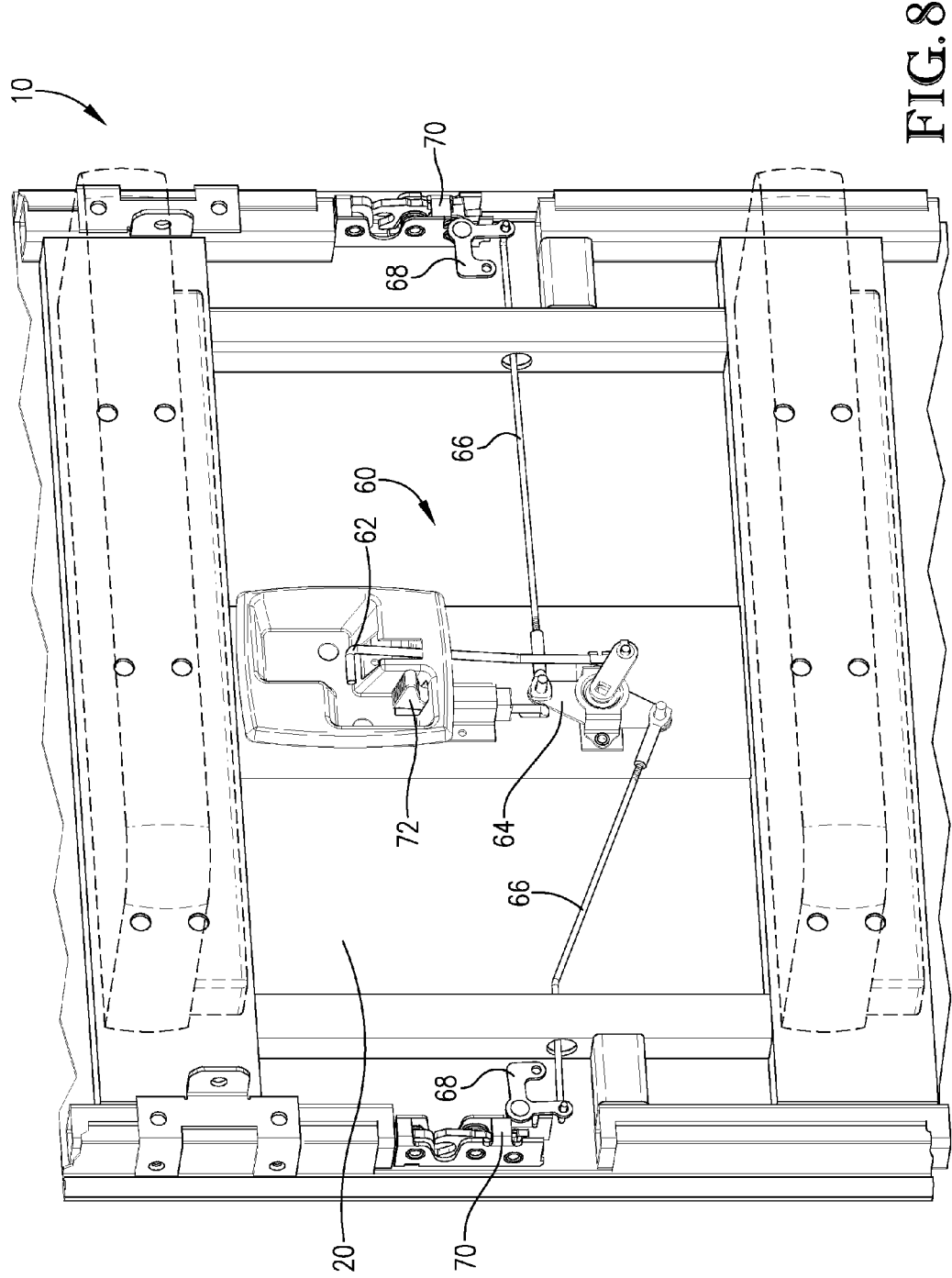
FIG. 8 is an interior partial perspective view of the emergency exit door assembly from FIGS. 1-7, with a portion of an interior-facing surface of the emergency exit door assembly removed to illustrate a latching mechanism for securing the emergency exit door in the closed position.

To secure the main panel 20 of the door assembly 10 in the closed position (i.e., FIGS. 1, 4, and 6) and to actuate the main panel 20 of the door assembly 10 to the open position (i.e., FIG. 2), the door assembly 10 may include a latching mechanism 60, as is perhaps best shown by FIG. 8. The latching mechanism 60 may comprise a handle 62, a rotation assembly 64, one or more linking rods 66, locking components 68, locking brackets 70, and a safety latch 72. In some embodiments, the handle 62, the rotation assembly 64, the one or more linking rods 66, the locking components 68, and the safety latch 72 may all be integrated with the door panel 20, while the a locking brackets 70 may be integrated with the vehicle 12 or with the door frame 32. Generally, the handle 62 is operable to selectively configure the latching mechanism 60 in either a locked position or an unlocked position. In the locked position, the latching mechanism is configured to secure the main panel 20 of the door assembly 10 in the closed position (i.e., FIGS. 1, 4, and 6). In the unlocked position, the latching mechanism 60 is configured to unsecure the main panel 20 of the door assembly 10, so as to allow the door assembly to transition to the open position (i.e., FIGS. 2, 5, and 7).

In the locked position, the locking components 68 are engaged with the locking brackets 70 so as to secure the main panel 20 to the vehicle 12 and/or to the door frame 32. To transition the latching mechanism 60 from the locked position to the unlocked position, the handle 62 may be actuated so as to cause a rotation in the rotation assembly 54. Such a rotation may cause the one or more linking rods 66, which are secured to the locking components 68, to actuate (e.g., shift inward), so as to disengage the locking components 68 with the locking brackets 70. As such, the latching mechanism 60 will be in the unlocked position, such that the main panel 20 of the door assembly 10 can shift from the closed position to the open position. In some embodiments, the latching mechanism 60 will include the safety mechanism 72 for preventing the latching mechanism 60 from being inadvertently transitioned from the locked position to the unlocked position.

In operation, the door assembly 10 can be selectively positioned in either the closed position, as shown in FIG. 1, or the open position, as shown in FIG. 2. In the closed position, the latching mechanism 60 secures the main panel 20 in place such that the top side 26 of the main panel 20 is oriented further away from a ground surface than the bottom side 28 of the main panel 20. In such a position, the exterior facing surface 24 of the main panel 20 may be generally flush and/or coplanar with the side of the vehicle 12.

To transition the door assembly 10 from the closed position to the open position, the handle 62 of the latching mechanism 60 can manipulated to cause the locking components 68 to release from locking brackets 70. Thereafter, the main panel 20 can be swung out from the side of the vehicle 12. Specifically, the main panel 20 may rotate about the hinge member 30, until the top side 26 of the main panel 20 is positioned closer to the ground surface than the bottom side 28 of the main panel 20. The main panel 20 may be held and/or supported in such an open position by the longitudinal supports 52, as shown in FIG. 2. In some embodiments, the top side 26 of the main panel 20 may be spaced apart from the ground level between 5 to 40 inches, between 15 to 30 inches, or between 20 to 25 inches. In other embodiments, the top side 26 of the main panel 20 may contact or rest on the ground surface.

The length of the longitudinal supports 52 may determine the distance at which the top side 26 of the main panel 20 is spaced apart from the ground level when the door assembly 10 is in the open position. Additionally, with reference to FIG. 2, the length of the longitudinal supports 52 may determine an angle of inclination 70 at which the main panel 20 is orientated with respect to a vertical axis X. For instance, in some embodiments, the inclination angle 70 may have a magnitude of between 5 and 60 degrees, between 20 and 45 degrees, or about 30 degrees.

With the door assembly 10 in the open position, as shown in FIG. 2, the doorway 58 is presented through the side of the vehicle 12, such that passengers of the vehicle 12 can egress therethrough. Specifically, the doorway 58 can provide an emergency exit (egress) from the vehicle 12, which the passengers can use in an emergency situation, such as a fire or medical emergency. In particular, the projection members 40 extending from the main panel 20 can be used a steps on which the passengers can descend during their egress from the vehicle 12. Such projection members 40 may be used as steps because they are secured to the main panel 20 in a secure fashion and provide a surface area (via the second major surface 44) that is sufficiently sized to receive a foot of a passenger. Because the top side of the main panel 20 is generally positioned close to the ground surface, passengers can efficiently and safely exit from the vehicle 12 and onto the ground surface. Furthermore, the longitudinal supports 52 may be used as handrails to facilitate the egress of the passengers from the vehicle 12.

Figure 9:
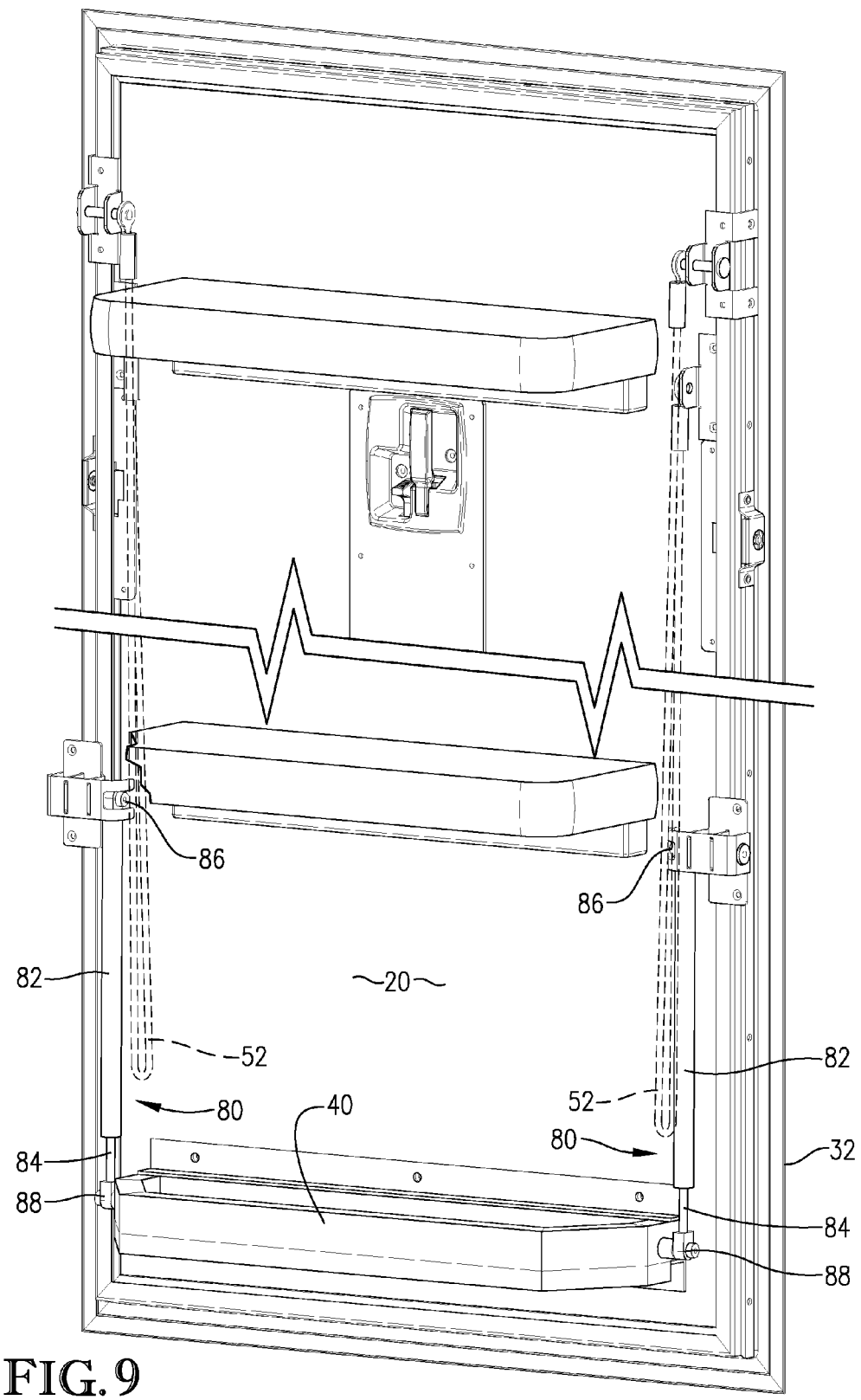
FIG. 9 is a interior broken perspective view of an additional embodiment of an emergency exit door assembly according to embodiments of the present invention, with the emergency exit door assembly in the closed position and including support struts connecting a main panel to a door frame.
Figure 10:
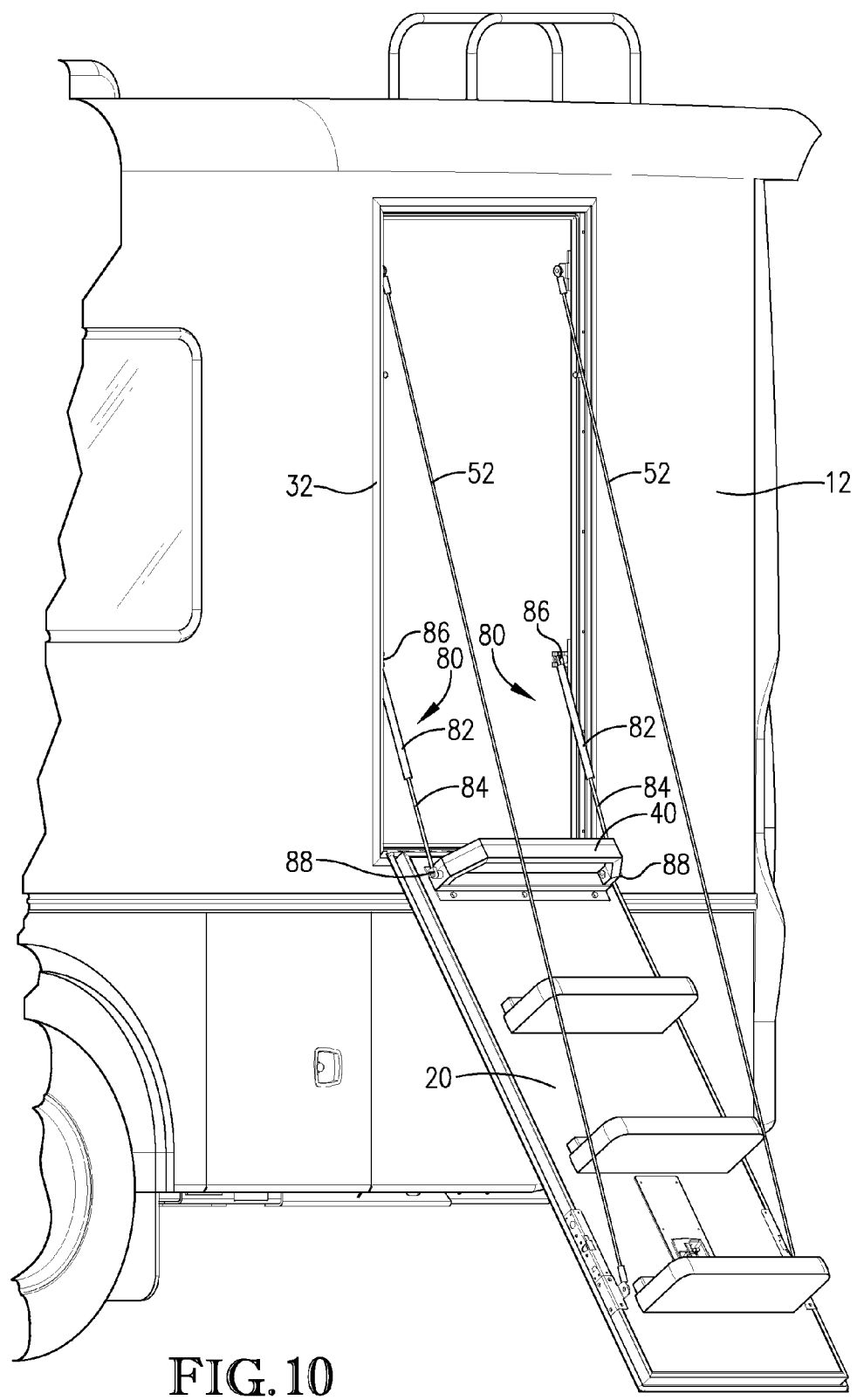
FIG. 10 is a partial perspective view a recreational vehicle with the emergency exit door assembly from FIG. 9 in an open position, particularly showing the support struts supporting the emergency exit door assembly in the open position.

Embodiments of the present invention may also include components that enhance the stability and functionality of the door assembly 10. For example, certain embodiments may include one or more support struts 80, as illustrated in FIGS. 9 and 10, which function to support the main panel 20 in the open position and to dampen the motion of the main panel 20 as it swings open from the closed position to the open position. Such support struts 80 may comprise various components capable of supporting the main panel 20, such as rigid rods, elastic members, mechanical springs, gas springs, or the like. For instance, as illustrated in FIGS. 9 and 10, embodiments of the present invention may include two support struts 80, in the form of gas springs, which connect the main panel 20 to the door frame 32 and/or to the vehicle 12. In more detail, each of the support struts 80 may include a main cylinder 82 with a pressurized gas therein and a piston 84 configured to be received within and extend from the main cylinder 82. A first end 86 of each support strut 80 may be rotatably coupled with the door frame 32, while a second end 88 of each support strut 80 may be rotatably coupled with the main panel 20. As shown in FIGS. 9 and 10, the second end 88 of the support strut 80 may be secured to a bottom-most of the projection members 40.

In operation, the support struts 80 are configured to support the door assembly 10 in the open position, as illustrated in FIG. 10. To transition the door assembly 10, the door assembly 10 may start in the closed position as shown in FIG. 9. In such a position, the piston 84 of the support strut 80 may be retracted within the main cylinder 82. Upon the door assembly 10 transitioning from the closed position to the open position, the piston 84 may begin to extend from main cylinder 82 as the piston 84 is pulled out by the main door panel 20. Once the door assembly 10 has reached the open position, the piston 84 may be fully extended with respect to the main cylinder 82, such that the support struts 80 may rigidly support the main panel 20 in the open position. Furthermore, the support struts 80 in the form of gas springs may function to dampen the motion of the main panel 20 is it transitions to the open position. Specifically, due to the pressurized gas in the main cylinder 82, the support struts 80 may act as a counter balance to allow the main panel 20 to smoothly (under support from the support struts 80) open from the closed position to the open position. The ability of the support struts 80 to dampen the motion of the door assembly may enhance the durability and the longevity of the components of the door assembly 10 because such components will not be required to endure significant impact forces during the transition from the open to the closed position. Furthermore, the support struts 80 can act as a counter balance to assist an occupant of the vehicle 12 in closing the door assembly 10 from the open position to the closed position. As such, the door assembly 10 is configured to transition from the closed position to the open position, and from the open position to the closed position, over multiple cycles without causing damage and/or significant wear-and-tear to the components of the door assembly 10.

In addition to providing an emergency exit, embodiments of the present invention allow for the door assembly 10 to be used a furniture item, while the door assembly 10 is in the closed position. As such, the door assembly 10 may not conspicuously stand-out as an emergency exit. In particular, as shown in FIG. 3, with the door assembly 10 in the closed position, the projection members 40 extend generally horizontally from the main panel 20 towards an interior space of the vehicle 12 (e.g., the interior space of the bathroom of the vehicle 12). As such, the projection members 40 can act as cabinet components or shelves for supporting various personal items (e.g., books, pictures, knick-knacks, etc.). Specifically, the first major surface 42 of each of the projection members 40 can be used to support such personal items. Furthermore, as described above, portions of the main panel 20, such as the interior-facing surface 24 can be formed form various materials, including wood-based materials, wood veneer, laminates, or the like. As such, the door assembly 10 can be configured to appear cosmetically similar to adjacent portions of the interior space of the vehicle 12. As such, the door assembly 10 can be advantageously camouflaged to coordinate with adjacent portions of the vehicle 12, such that the door assembly 10 does not conspicuously stand-out as an emergency exit.

The door assembly 10 can be further camouflaged by having the door assembly 10 integrated with specific features of the vehicle 12. For instance, as shown in FIG. 3, the door assembly can be associated with the bathroom of the vehicle 12 and specifically integrated on a wall/side of the vehicle directly behind the toilet 16. In such a configuration, the toilet 16 (and its functional components) can cover a significant portion of a bottom of the door assembly. As such, the door assembly 10 does not conspicuously stand-out as an emergency exit.

Although the invention has been described with reference to the preferred embodiment(s), it is noted that equivalents may be employed and substitutions made herein without departing from the scope of the invention. Thus, the invention described herein is entitled to those equivalents and substitutions that perform substantially the same function in substantially the same way.

Having thus described various embodiments of the invention, what is claimed as new and desired to be protected by Letters Patent includes the following:

1. An emergency exit door assembly for a vehicle, said door assembly comprising:
   a main panel including an interior-facing surface and exterior-facing surface,
   wherein said main panel is rotatably connected to the vehicle, such that said main panel is configured to selectively alternate between a closed position in which said interior-facing surface faces an interior of the vehicle and an open position in which said interior-facing surface faces an exterior of the vehicle;
   one or more projection members extending from said interior-facing surface of said main panel,
   wherein said projection members each includes a first major surface configured horizontally to support articles within an interior of the vehicle while said main panel is in the closed position; and
   a support mechanism configured to support said main panel in the open position.

2. The door assembly of claim 1, wherein said main panel is generally rectangular and includes a top side, a bottom side, and two lateral sides.

3. The door assembly of claim 2, wherein said bottom side of said main panel is rotatably coupled to the vehicle via a hinge member.

4. The door assembly of claim 2, wherein said support mechanism comprises one or more longitudinal supports each comprising a first end connected to the vehicle and a second end connected to said main panel.

5. The door assembly of claim 4, wherein said second ends of said longitudinal supports are connected to said main panel at a location adjacent to said top side of said main panel.

6. The door assembly of claim 4, wherein said longitudinal supports each comprises a flexible member selected from one or more of the following: a metal cable, a chain, a cord, or a rope.

7. The door assembly of claim 6, wherein said flexible member includes a flexible covering material formed around an outside of said flexible member.

8. The door assembly of claim 2, wherein said door assembly comprises at least four projection members spaced apart between said top side and said bottom side of said main panel.

9. The door assembly of claim 8, wherein said projection members each comprises a generally rectangular plank, and wherein said projection members extend generally perpendicularly from said main panel.

10. The door assembly of claim 9, wherein said projection members each includes a major surface, wherein said major surface has an area sized to accommodate an average foot size of an adult human.

11. The door assembly of claim 1, wherein said door assembly is positioned on a side of the vehicle.

12. The door assembly of claim 11, wherein in the closed position, said main panel is generally coplanar with the side of the vehicle.

13. The door assembly of claim 2, wherein in the closed position, said top side of said main panel is positioned further from a ground level than said bottom side of said main panel, and wherein in the open position, said main panel is rotated such that said top side is positioned closer to the ground level than said bottom side.

14. The door assembly of claim 1, wherein in the open position, said main panel is orientated at an inclination angle with respect to a vertical axis, and wherein the inclination angle has a magnitude between 20 and 45 degrees.

15. A door assembly for a vehicle, said door assembly comprising:
 a main panel including an interior-facing surface and exterior-facing surface,
 wherein said main panel is configured to selectively alternate between a closed position and an open position; and
 one or more projection members extending from said interior-facing surface of said main panel, wherein each of said projection members includes a first major surface and a second major surface,
 wherein in the closed position, said first major surfaces of said projection members are configured horizontally to support articles within an interior of the vehicle,
 wherein in the open position, said second major surfaces of said projection members are configured to support a foot of a user egressing from the vehicle.

16. The door assembly of claim 15, wherein the vehicle is a recreational vehicle selected from a motorcoach and a travel trailer.

17. The door assembly of claim 16, wherein said door assembly is associated with a bathroom of the recreational vehicle.

18. The door assembly of claim 15, wherein said main panel is maintained in the closed position via a latching mechanism configured to alternate between a locked position and an unlocked position.

19. A method of operating an emergency exit door assembly for a vehicle, with the door assembly comprising a main panel with a top side and a bottom side and a plurality of projection members extending generally perpendicularly from the main panel, wherein the method comprises the steps of:
 (a) unlatching the main panel from the vehicle;
 (b) causing the main panel to actuate from a closed position, in which the top side extends further from a ground level than the bottom side, to an open position, in which the bottom side extends further from the ground level than the top side,
 wherein in the closed position the projection members are configured horizontally to support one or more articles within an interior of the vehicle,
 wherein in the open position the projection members are configured to support a foot of a human passenger of the vehicle, as the passenger egresses from the vehicle.

20. The method of claim 19, wherein in the open position, the main panel is at least partially supported by a flexible support mechanism, and wherein the flexible support mechanism is configured to act as a handrail for the passenger during egress from the vehicle.

\* \* \* \* \*